Figure 1:
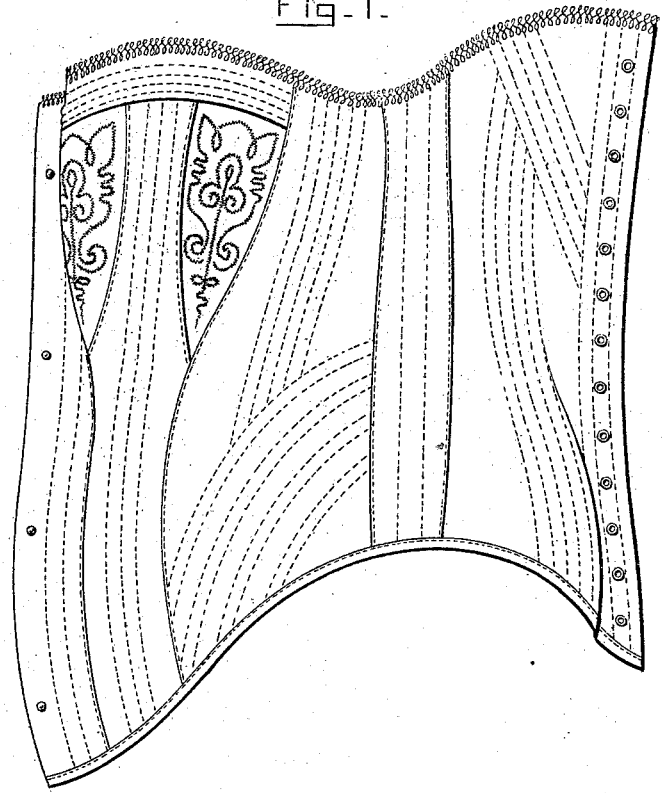

(Model.)

M. W. HENIUS.
Corset.

No. 238,899.  Patented March 15, 1881.

WITNESSES:
Philip F. Larned
H. Bartle

INVENTOR:
Max W. Henius
By [signature]
Attorney

UNITED STATES PATENT OFFICE.

MAX W. HENIUS, OF NEW YORK, N. Y.

CORSET.

SPECIFICATION forming part of Letters Patent No. 238,899, dated March 15, 1881.

Application filed December 28, 1880. (Model.)

*To all whom it may concern:*

Be it known that I, MAX W. HENIUS, of the city, county, and State of New York, have invented certain new and useful Improvements in Corsets; and I do hereby declare that the following specification, taken in connection with the drawings furnished and forming a part thereof, is a clear, true, and complete description of my invention.

Although I hereinafter make claim to corsets embodying my invention because of their obviously novel features, I desire it to be understood that their production involves what I deem to be a novel method of manufacture, and while as corsets they are deemed by me superior to any heretofore made of which I have cognizance, the value of my invention is not confined to the goods themselves, but it extends also into their manufacture with accruing economic results of material importance.

Corsets as heretofore constructed may properly be classed under two general heads, "seamed" and "woven." My novel corset is the pioneer of another distinctive class of goods, in that it combines the seamless characteristic of the woven corset with the stitched characteristics of the seamed corset, thus enabling the union of the peculiar advantages incident to the two distinct methods of manufacture, as heretofore practiced, and obviating the well-known disadvantages incident to each method. Economy in the manufacture of woven corsets is coupled with the great strength and durability incident to a seamless structure; but the impracticability of attaining the almost endless variation in the arrangement of bones, and the degree of external finish required by the trade has practically limited the manufacture of woven corsets to certain fixed or set styles, and prevented them from reaching a certain higher class of trade, practically monopolized heretofore by the seamed or sewed corset. I have heretofore devised a method of manufacturing woven corsets whereby any desired variations in the arrangement of bones may be readily and cheaply attained, coupled with certain advantages in finish which have been heretofore limited to sewed corsets; but my said prior improvements relate exclusively to woven corsets, and they have been made the subject of an application for Letters Patent heretofore filed by me.

My present improvement involves, as an essential feature, a seamless woven fabric containing the swells, curves, and outline required for one-half of a corset. This fabric may be solidly woven throughout—*i. e.*, without bone-pockets—or it may at one or more points be provided with woven bone-pockets, provided always that at certain other points, as may be desirable in each case, the seamless fabric be woven solidly—*i. e.*, not double—and is covered upon the surface at such solidly-woven portion with sections of fabric stitched together, and to the seamless fabric in such manner that bone-pockets may be formed between the two fabrics by stitching, as in sewed corsets, and to also afford more or less of the external characteristics of a sewed corset or a woven corset. The employment of two seamless fabrics, counterparts, placed one over the other and stitched together to form the bone-pockets in any desired arrangement will also be within my invention, because in such a corset the stitching will be as in a sewed corset throughout, so far as relates to the bone-pockets, and the outer fabric being woven singly may be ornamentally woven in great variety of finish without regard to strength of material, the inner fabric being wholly relied upon to resist the strains incident to wear.

Inasmuch as I seek in part to attain greater strength of the goods and economy in manufacture as compared with sewed or seamed corsets, coupled with the widely-varying grouping and arrangement of bones not heretofore practically attained in woven corsets, it is obvious that those ends are attainable to a more or less desirable degree, whether the seamless fabric be employed as the interior portion of the corset or the exterior, because in the latter case the addition thereto of the interior seamed sections will provide for the stitched bone-pockets.

Broadly stated, the main feature of my invention consists in a corset composed of a seamless fabric woven in the desired or suitable outline and contour, with additional fabric stitched thereto and forming bone-pockets between the two fabrics.

My invention further consists of a corset composed of a seamless foundation fabric woven to the desired contour and outline, and an external or finishing fabric stitched to the foundation fabric, so as to firmly unite the two fabrics and afford bone-pockets in any desired location, grouping, or arrangement. As before indicated, the external fabric may be seamless, or it may be made up in sections, and the foundation fabric may or may not contain more or less bone-pockets.

To more particulary describe my invention I will refer to the accompanying drawings, in which—

Figure 2:
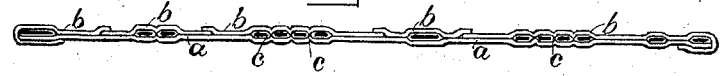

Figure 1 is a side view of a corset embodying my invention. Fig. 2 represents the same in section on the line of the waist.

I have chosen for illustration a corset having a seamless foundation fabric, and an external fabric composed of various parts or sections which are stitched to each other and to the foundation fabric.

Referring to the sectional view, Fig. 2, $a$ denotes the foundation fabric woven seamless with the breast-fronts and hip-gores formed by weaving, and in that respect, as heretofore in woven corsets, said foundation having the desired outline and contour. Being in this style of corset a mere foundation, it can obviously be woven with strong, heavy yarns, and need not be beaten up heavily, and therefore can be woven rapidly and cheaply.

The several sections $b$ are or may be cut from patterns heretofore employed for sewed corsets, if suited to the particular foundation fabric in size and contour, and they may be first stitched together to form a counterpart of the foundation fabric, or stitched directly upon the latter, one by one, utilizing, whenever desirable, the same line or lines of stitching for effecting a union of the edges of adjacent sections simultaneously with their union to the foundation fabric. The bone-pockets $c$ are formed, as in sewed corsets, by lines of stitches uniting the outer with the seamless foundation fabric. These pockets may be indefinitely varied in location, grouping, or arrangement with reference to each other without in any manner departing from my invention.

It will be seen that although my novel corsets possess the desirable characteristics of the woven corset, they do not require starching and finishing after the bones are in place, as in woven corsets; but the woven seamless portion, like the fabrics from which the seamed sections are cut, can be finely finished before being worked into the corset, thus obviating the necessity of inserting the back and front steels prior to starching, ironing, and finishing, as in woven corsets, because they can be located and confined during the union of the two already-finished fabrics by stitching.

It will also be seen that the seamless woven fabric serves as a guide or gage for the proper location of the several seamed sections, thus enabling the work to be more rapidly, accurately, and cheaply executed than with seamed corsets as heretofore made, and even if the sewed sections be not accurately located in all cases it will not impair the fit of the corset, for that is already predetermined by the weaving of the seamless portion thereof, it being only requisite that the seamed sections shall lie flatly or smoothly upon the seamless fabric.

Having thus described my invention, I claim as new, to be secured by Letters Patent—

1. A corset composed of a seamless fabric woven in suitable outline and contour, and of additional fabric stitched to the first, and having bone-pockets between said fabrics, substantially as described.

2. In a corset, a seamless foundation fabric woven in suitable outline and contour, and an exterior finishing fabric in sections stitched to the foundation fabric, firmly united thereto, and bone-pockets between said fabrics, substantially as described.

MAX W. HENIUS.

Witnesses:
HENRY SARONI,
LEON S. COHEN.